(12) United States Patent
Ewald

(10) Patent No.: US 8,844,476 B2
(45) Date of Patent: Sep. 30, 2014

(54) MOTOR-DRIVEN IMPLEMENT HAVING SWITCHABLE SUMMER-WINTER OPERATING FUNCTION

(75) Inventor: Jörg Ewald, Hamburg (DE)

(73) Assignee: Makita Corporation, Anjo-Shi (JP)

( * ) Notice: Subject to any disclaimer, the term of this patent is extended or adjusted under 35 U.S.C. 154(b) by 444 days.

(21) Appl. No.: 13/304,506

(22) Filed: Nov. 25, 2011

(65) Prior Publication Data

US 2012/0132181 A1 May 31, 2012

(30) Foreign Application Priority Data

Nov. 30, 2010 (DE) .................... 20 2010 016 016 U

(51) Int. Cl.
| | |
|---|---|
| *F01P 7/04* | (2006.01) |
| *F02M 31/06* | (2006.01) |
| *F02M 31/14* | (2006.01) |
| *F02B 63/02* | (2006.01) |
| *F02M 35/10* | (2006.01) |
| *F02M 15/02* | (2006.01) |

(52) U.S. Cl.
CPC ............. *F02M 31/066* (2013.01); *F02B 63/02* (2013.01); *F02M 35/1019* (2013.01); *F02M 35/1017* (2013.01); *Y02T 10/126* (2013.01); *F02M 31/145* (2013.01); *F02M 35/10255* (2013.01); *F02M 35/10268* (2013.01); *F02M 35/10013* (2013.01); *F02M 15/02* (2013.01)
USPC ....................................... 123/41.65; 123/543

(58) Field of Classification Search
USPC ........ 123/41.56, 41.65, 41.69, 41.7, 540, 543
See application file for complete search history.

(56) References Cited

FOREIGN PATENT DOCUMENTS

| | | |
|---|---|---|
| DE | 35 23 949 A1 | 1/1987 |
| DE | 37 41 018 A1 | 6/1988 |
| DE | 10 2009 008 055 A1 | 8/2010 |

OTHER PUBLICATIONS

Jun. 21, 2011 German Search Report issued in German Patent Application No. 20 2010 016 016.2 (with translation).

*Primary Examiner* — Noah Kamen
(74) *Attorney, Agent, or Firm* — Oliff PLC

(57) ABSTRACT

A motor driven implement having an internal combustion engine having at least one cylinder and at least one carburettor, which is disposed in a carburettor chamber, which is separated by an intermediate wall from an engine compartment, wherein a fan wheel is further provided by which means air from the engine compartment can be introduced through an engine compartment opening in the intermediate wall into the carburettor chamber. A warm air opening is provided in the intermediate wall, through which the air heated over the cylinder can be introduced into the carburettor chamber and wherein an adjusting element is provided which can be brought into a summer position in which the engine compartment opening is open and the warm air opening is closed and which can be brought into a winter position in which the engine compartment opening is closed and the warm air opening is open.

12 Claims, 3 Drawing Sheets

Fig. 3

MOTOR-DRIVEN IMPLEMENT HAVING SWITCHABLE SUMMER-WINTER OPERATING FUNCTION

The present invention relates to a motor-driven implement such as a chain saw, a hand grinder, a hand-held circular saw, a lawn mower, a lawn trimmer or another hand-held tool or device for garden and landscape maintenance, comprising an internal combustion engine having at least one cylinder and at least one carburettor, which is disposed in a carburettor chamber, which is separated by an intermediate wall from an engine compartment, wherein a fan wheel is further provided by which means air from the engine compartment can be introduced through an engine compartment opening in the intermediate wall into the carburettor chamber.

PRIOR ART

Known from document DE 10 2009 008 055 A1 is a generic motor-driven implement comprising an internal combustion engine in an engine compartment and comprising a carburettor in a carburettor chamber, where the carburettor chamber and the engine compartment are separated by an intermediate wall. A closure element is provided in an engine compartment opening in the intermediate wall, which is configured in such a manner that different fractions of cooling air can either be led past the cylinder or led directly into the carburettor chamber. The direct transfer of the heated air into the carburettor chamber is thereby possible, where the closure element is configured in such a way that in a selectable position the cooling air is divided into one partial air flow to the carburettor and one partial air flow for acting upon cooling ribs. In this way, both a sufficient heating of the carburettor and a sufficient cooling of the cylinder on the side facing away from the fan wheel can be achieved. However, the disadvantage arises that it is certainly possible to deflect the air over the cylinder but this cannot be introduced as heated air into the carburettor chamber in order to operate the carburettor with heated air at low outside temperatures. The fraction of air guided over the cylinder for cooling can certainly be varied by means of the closure element but for example, no possibility is given for providing by means of the closure element a severe cooling of the cylinder whilst simultaneously supplying cold air into the carburettor chamber, for example, for summer operation of the motor-driven implement at high outside temperatures.

It is therefore the object of the present invention to provide a motor-driven implement having an improved summer-winter operating function. In particular, it is the object of the present invention to further simplify an element for switching between summer-winter operation.

This object is solved starting from a motor-driven implement according to the preamble of claim 1 in conjunction with the characterising features. Advantageous further developments of the invention are specified in the dependent claims.

DISCLOSURE OF THE INVENTION

The invention includes the technical teaching that in addition to the engine compartment opening, a warm air opening is provided in the intermediate wall, through which the air heated over the cylinder can be introduced into the carburettor chamber and wherein an adjusting element is provided which can be brought into a summer position in which the engine compartment opening is open and the warm air opening is closed and which can be brought into a winter position in which the engine compartment opening is closed and the warm air opening is open.

Starting from a motor-driven implement that has an engine compartment opening in the lower area of the intermediate wall in order to transfer non-heated or only slightly heated air from the lower engine compartment into the carburettor chamber, which consequently was not heated by the cylinder, it is provided according to the invention that in addition to the engine compartment opening, a warm air opening located separately from this is provided in the intermediate wall. As desired, air can be passed through the warm air opening into the carburettor chamber, which air is warmer than the air which can be passed via the engine compartment opening into the carburettor chamber. The air introduced via the warm air opening through the intermediate wall into the carburettor chamber is initially heated via the cylinder of the motor and consequently has a high temperature. In order to provide a switching of the air flow into the carburettor chamber either through the engine compartment opening or through the warm air opening, the invention further provides an adjusting element that can be brought into a summer position in which the engine compartment opening is open and the warm air opening is closed and that can further be brought into a winter position in which the engine compartment opening is closed and the warm air opening is open in order to supply the carburettor chamber with high temperature air.

According to an advantageous embodiment, the motor-driven implement can have a dust pre-separator which is connected at least to the engine compartment opening. The engine compartment opening preferably penetrates through the intermediate wall in the lower area of the carburettor chamber and at the height of a crank case of the internal combustion engine opens into the lower area of the engine compartment facing away from the cylinder. The air entering the carburettor chamber via the engine compartment opening is therefore not significantly heated before entering into the carburettor chamber.

The adjusting element can advantageously be configured as a sliding element that can be moved preferably linearly to and fro between the summer position and the winter position. The to and fro movement between the summer position and the winter position can take place so that one of the openings is closed whilst the other opening is open whereby a selectable ventilation of the carburettor chamber either with cold or with warm air from the engine compartment is provided.

According to a possible further embodiment, the adjusting element can be configured as a sheet metal component and comprise a first section which is configured to close the engine compartment opening and the sheet metal component can comprise a second section which is configured to close the warm air opening. The adjusting element is constituted in its geometrical dimension in such a manner that the openings incorporated in the intermediate wall at a certain distance from one another can be closed and opened with a single adjusting element. In particular, the adjusting element can have a U-shaped configuration where a first leg of the U shape forms the first section and a second leg of the U shape forms the second section and where the carburettor is encased in the U shape. Consequently, the engine compartment opening and the warm air opening can be located on different sides of the carburettor which likewise penetrates the intermediate wall in order to connect the carburettor to the air inlet of the internal combustion engine. Alternatively, the engine compartment opening and the warm air opening can be disposed adjacent to one another in the intermediate wall and the adjusting element can be configured as a rectangular plate and alternately close or expose the openings.

The intermediate wall between the engine compartment and the carburettor chamber can comprise a flat extension at least in sections, where the adjusting element is disposed plane-parallel and preferably adjacent to the intermediate wall. The carburettor can likewise be disposed on the intermediate wall and the engine compartment opening is disposed on the first side of the carburettor and the warm air opening is disposed on the second side of the carburettor opposite the first side. The first side can be a fan wheel side and the second opposite side can be a driven side of the internal combustion engine. The U-shaped adjusting element can according to an advantageous embodiment consequently embrace the carburettor and slide during the to and fro movement between the summer position and the winter position on the intermediate wall at least in sections.

Advantageously guide elements are provided which are used for guidance of the linear movement of the adjusting element, where the guide elements are preferably disposed in or on the intermediate wall. The guide elements can be configured as groove guides and guide slots are incorporated on the adjusting element into which the guide elements engage, which are disposed in particular on the edge zone of the intermediate wall. The summer position and the winter position thereby form end positions of the movement of the adjusting element and in the end positions the warm air opening is closed in each case whereas the engine compartment opening and therefore the preseparator are open or the engine compartment opening or the pre-separator is closed whilst the warm air opening is open.

The adjusting element can advantageously have a handle by which means the adjusting element can be actuated manually. The carburettor chamber can be configured to be airtight at least partially by at least one cover element in such a manner that an air inflow into the carburettor chamber is limited to an air inflow through the engine compartment opening or through the warm air opening. If the adjusting element is to be displaced between the summer position and the winter position, the cover element of the carburettor chamber can be removed in order to reach the handle of the adjusting element.

According to a further advantageous embodiment of the motor-driven implement, a spark plug can be provided in the area of the upper part of the cylinder, where the warm air opening is disposed in the area of the spark plug, preferably in the area 10 mm above the upper dead point of a piston guided in the cylinder and particularly preferably in the area of cooling ribs disposed on the upper side of the cylinder. A particularly advantageous ventilation of the carburettor chamber with warm air is thus made possible since in the said region a particularly high ram pressure prevails between the upper part of the cylinder and a housing encasing the cylinder. As a result of the high ram pressure on the engine compartment side of the intermediate wall, a particularly strong air flow through the warm air opening into the carburettor chamber is rendered possible.

BRIEF DESCRIPTION OF THE DRAWINGS

Further measures which improve the invention are presented in detail hereinafter jointly with the description of a preferred exemplary embodiment of the invention by reference to the figures. In the figures.

PREFERRED EXEMPLARY EMBODIMENT OF THE INVENTION

Figure 1:
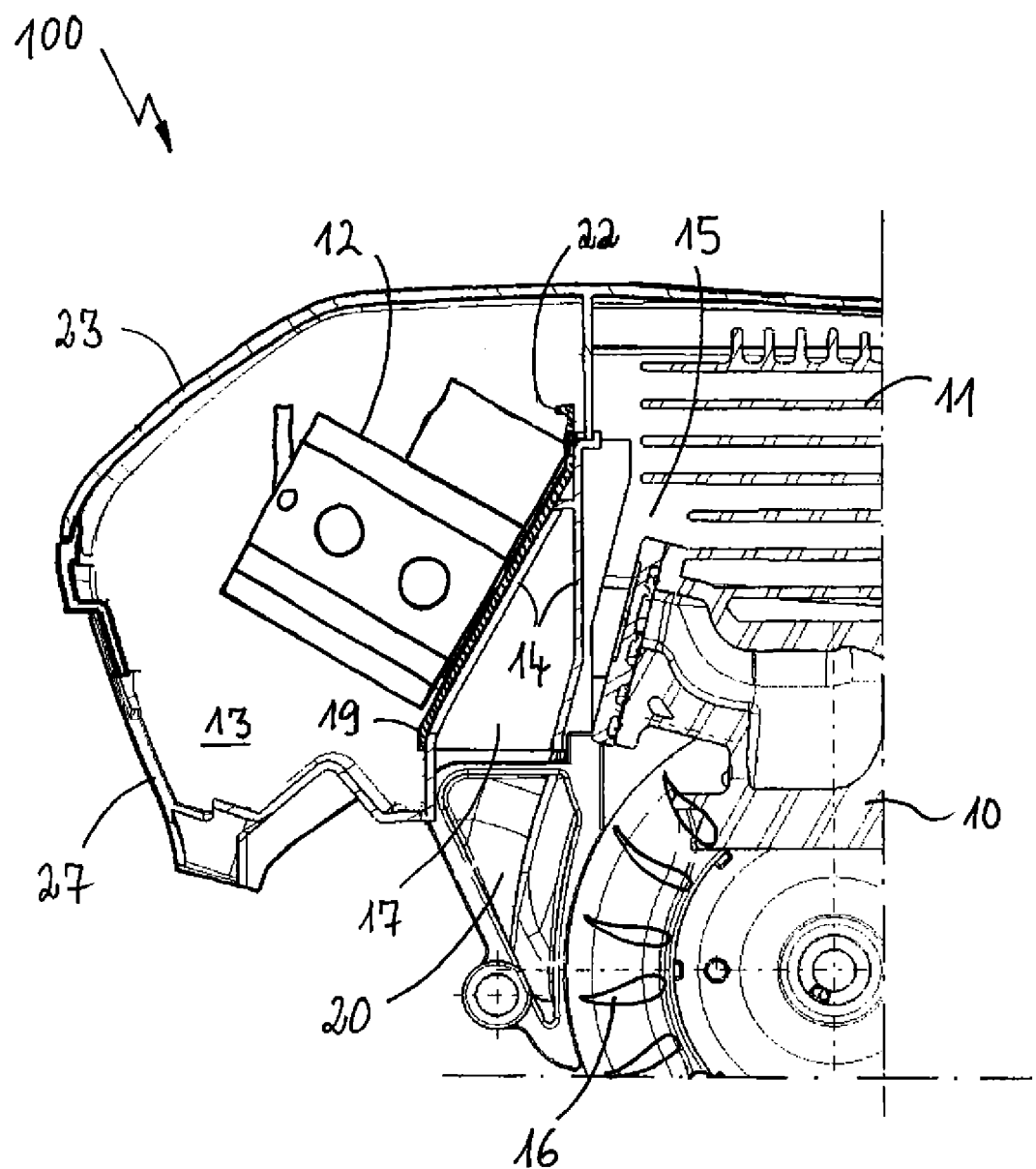
FIG. 1 shows a section of an exemplary embodiment of motor-driven implement in a transverse cutaway view with the features of the present invention.

FIG. 1 shows a section of an exemplary embodiment of a motor-driven implement 100 according to the invention in a transverse cutaway view. The motor-driven implement can be designed as a chain saw, as a hand grinder, as a hand-held circular saw, as a lawn mower, as a lawn trimmer or as another hand-held tool or device for garden and landscape maintenance and comprises an internal combustion engine 10 with a cylinder 11. A carburettor 12 is provided for operation of the internal combustion engine 10 and the internal combustion engine 10 is disposed in an engine compartment 15 and the carburettor 12 is disposed in a carburettor chamber 15. An intermediate wall 14 extends between the carburettor chamber 13 and the engine compartment 15. For operation of the internal combustion engine 10, combustion air taken from the carburettor chamber 13 is taken in through the carburettor 12. In order that air can pass from the engine compartment 15 into the carburettor chamber 13, an engine compartment opening 17 is incorporated in the intermediate wall 14 and air conveyed via a fan wheel 16 is conveyed through the engine compartment opening 17 into the carburettor chamber 13 whereby a slight excess pressure is formed in the carburettor chamber 13.

Adjacent to the intermediate wall 14, an adjusting element 19 is shown hatched, which can be brought into a summer position in which the engine compartment opening 17 is open and a warm air opening (not shown in detail) is closed, where the adjusting element 19 can further be brought into a winter position in which the engine compartment opening 17 is closed and the warm air opening is open. The adjusting element 19 is configured as a sheet metal component and is disposed plane-parallel to the intermediate wall 14 on said wall. At the top the adjusting element 19 has a handle 22 and when a cover element 23 at least partially forming the carburettor chamber 13 is removed, the adjusting element 19 can be displaced between the summer position and the winter position by means of manual operation of the handle 22.

A dust pre-separator 20 is also shown in part, which is at least connected to the engine compartment opening 17. The air passing into the carburettor chamber 13 at least through the engine compartment opening 17 can be purified by the dust pre-separator 20, where the engine compartment opening 17 is disposed adjacent to the dust pre-separator 20. An air flow through the dust pre-separator 20 is produced by the fan wheel 16 and the air can enter into the carburettor chamber 13 from the engine compartment opening 17 without stronger heating. If the engine compartment opening 17 is exposed in the summer position by the adjusting element 19, air which is not heated or only slightly heated passes from the engine compartment 15 into the carburettor chamber 13. If the adjusting element 19 is brought into the winter position, the engine compartment opening 17 is closed and the air conveyed by the fan wheel 16 can flow past the cylinder 11 of the internal combustion engine 10 and be conveyed into the carburettor chamber 13 via the warm air opening (not shown in detail).

Figure 2:
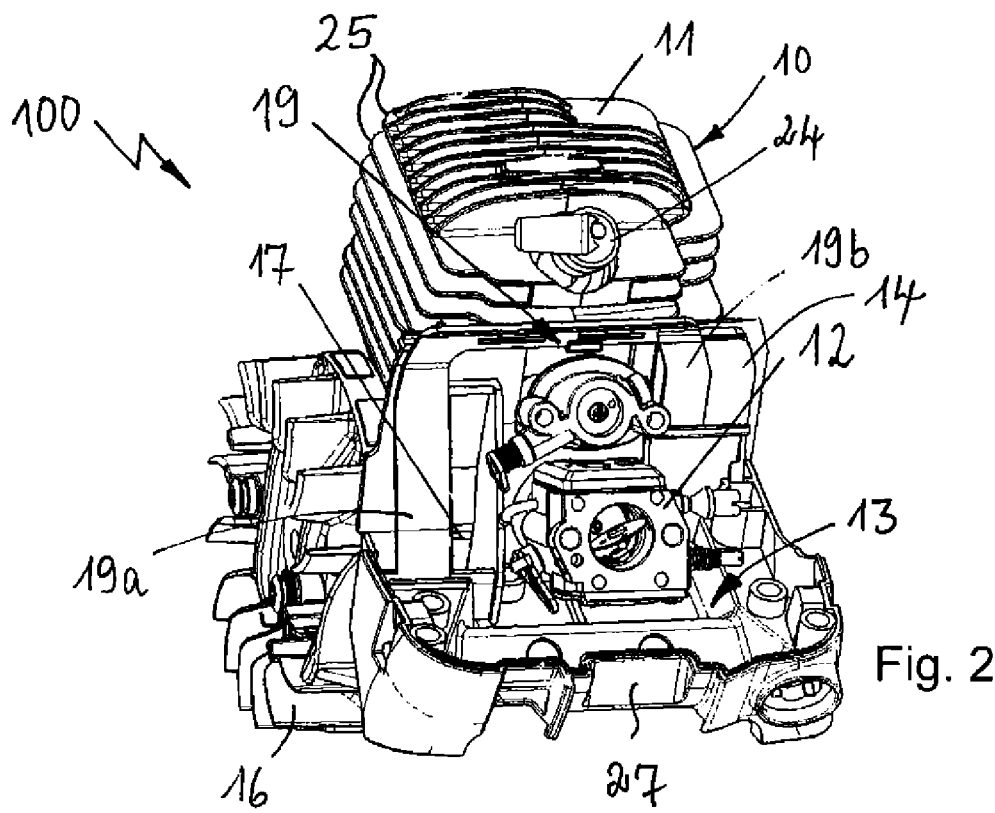
FIG. 2 shows a view of a motor for a motor-driven implement having an adjusting element according to the present invention which is located in the summer position.
Figure 3:
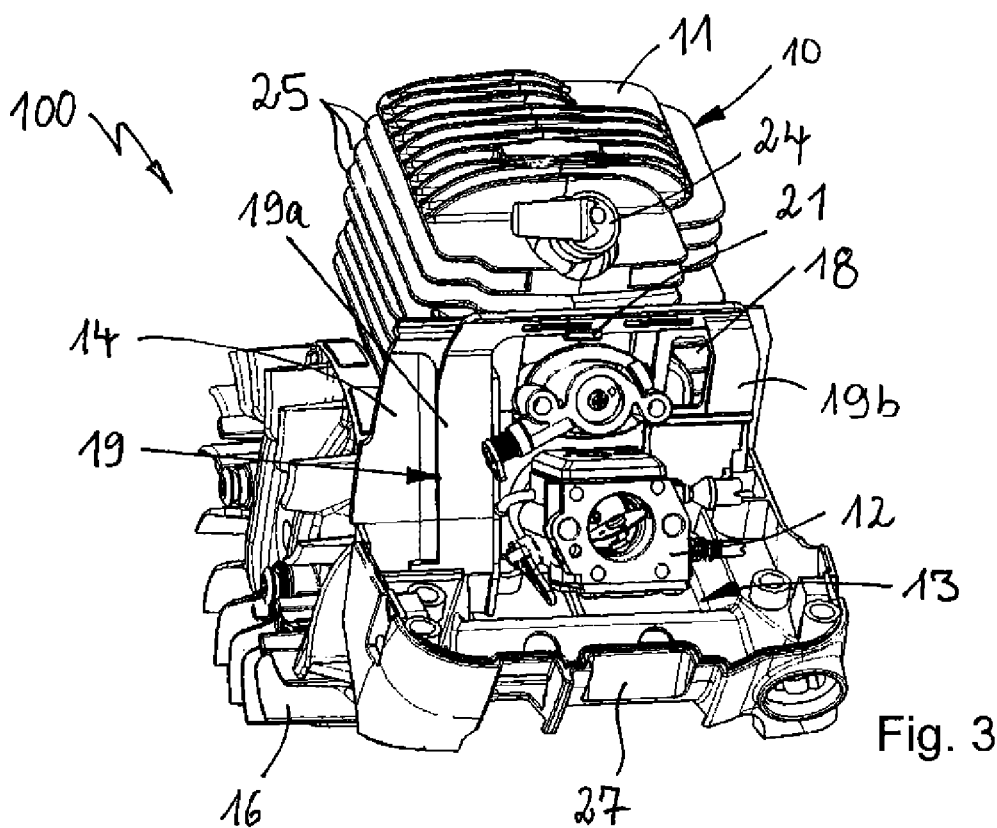
FIG. 3 shows a view of a motor for a motor-driven implement having an adjusting element according to the present invention which is located in the winter position.

FIGS. 2 and 3 show the motor-driven implement 100 in a partial view of the internal combustion engine 10 with the cylinder 11. FIG. 2 shows the motor-driven implement 100 with an adjusting element 19 according to the invention, which is disposed in the summer position whereas the adjusting element 19 in FIG. 3 is shown in the winter position. In the summer position of the adjusting element 19 the engine compartment opening 17 is exposed whilst the warm air opening 18 is closed. In the winter position of the motor-driven implement 100, on the other hand, the engine compartment opening 17 is closed and the warm air opening 18 is open.

In order to form the carburettor chamber 13, a carburettor chamber housing 27 is shown which is disposed adjacent to the internal combustion engine 10 and is used to accommodate the carburettor 12. The intermediate wall 14 for separating the engine compartment from the carburettor chamber 13 is designed as part of the carburettor chamber housing 27 and the adjusting element 19 is accommodated movably guided on the intermediate wall 14.

For alternate opening and closing of the engine compartment opening 17 and the warm air opening 18, the adjusting element 19 is configured with a first section 19a and a second section 19b. The adjusting element 19 is designed, for example, as a sheet metal component and is U-shaped, where the carburettor 12 is encased in the carburettor chamber 13 by the U shape of the adjusting element 19. In this case, the warm air opening 18 is located on a first side of the carburettor 12 and the engine compartment opening 17 is located on a second side of the carburettor 12 opposite the first side of the carburettor 12. This enables the engine compartment opening 17 and the warm air opening 18 to be alternately opened and closed by sliding the adjusting element 19 to and fro.

A guide element 21 which guides the adjusting element 19 on the upper side is provided for guidance of the adjusting element 19. It is further shown that the warm air opening 18 is located in the area of the spark plug 24 of the cylinder 11 and the air flowing initially around the cylinder 11 can be heated by this and enter into the carburettor chamber 13 through the warm air opening 18. For heating the air flowing around the cylinder 11, said cylinder has cooling ribs 25 and the warm air opening 18 is particularly advantageously disposed in the area of the spark plug 24 in the intermediate wall 14.

Figure 4:
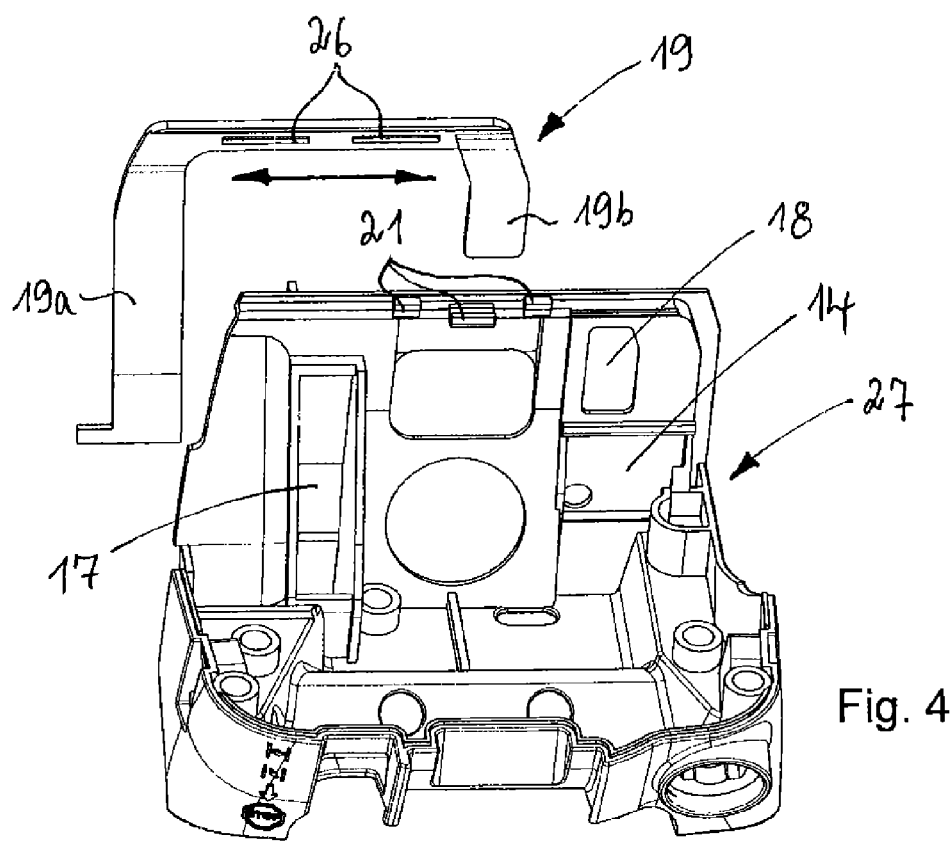
FIG. 4 shows a perspective view of a carburettor chamber housing to form the carburettor chamber with an engine compartment opening and a warm air opening as well as an adjusting element according to the invention and FIG. 5 shows a transverse cutaway side view of the arrangement of an adjusting element according to one exemplary embodiment of the present invention.

FIG. 4 shows a perspective view of the carburettor chamber housing 27 and the adjusting element 19. The adjusting element 19 is shown with a first section 19a and a second section 19b and the first section 19a is used to close the engine compartment opening 17 and the second section 19b of the adjusting element 19 is used to close the warm air opening 18. Guide elements 21 are provided on the top of the carburettor chamber housing 27, which elements enclose the adjusting element 19 in the area between the sections 19a and 19b or engage in guide slots 26 which are incorporated in the adjusting element 19. When the adjusting element 19 is mounted, this comes to abut against the intermediate wall 14 and can be moved to and fro between a summer position and a winter position in the direction of the arrow shown.

Figure 5:
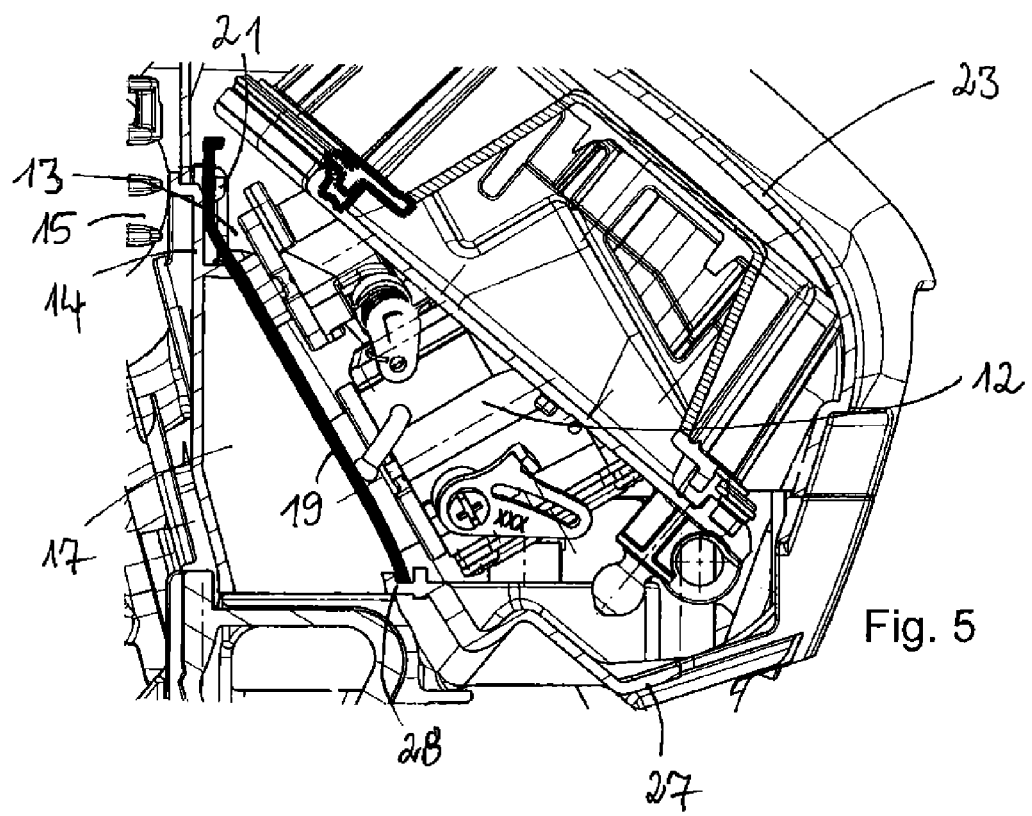

FIG. 5 finally shows a transverse cutaway view of the arrangement of the adjusting element 19 in the carburettor chamber housing 27 which is closed by an upper-side cover element 23 in order to create an airtight carburettor chamber 13 to receive the carburettor 12. The adjusting element 19 is disposed adjacently to the engine compartment opening 17 which is shown in the form of a large-aperture feed channel. Guide elements 21 are provided at the top for receiving the adjusting element 19, where a guide receptacle 28 configured as a guide groove is provided on the lower side. The intermediate wall 14 is further shown as part of the carburettor chamber housing 27 which separates the carburettor chamber 13 from the engine compartment 15. The adjusting element 19 is designed as a sheet metal component and has an increased resilience so that the adjusting element 19 can be bent resiliently in order to be inserted between the guide element 21 and the guide receptacle 28. If the adjusting element 19 springs back resiliently after removing the mounting force, this can be braced with slight pre-tension between the guide element 21 and the guide receptacle 28 in order to be accommodated slidingly and adjacently to the intermediate wall 14.

The invention is not restricted in its execution to the preferred exemplary embodiment specified hereinbefore. On the contrary, a number of variants are feasible which make use of the solution presented in fundamentally different embodiments. All the features and/or advantages deduced from the claims, the description or the drawings, including constructive details or spatial arrangements, can be essential for the invention both for themselves and in various combinations.

REFERENCE LIST

100 Motor-driven implement
10 Internal combustion engine
11 Cylinder
12 Carburettor
13 Carburettor chamber
14 Intermediate wall
15 Engine compartment
16 Fan wheel
17 Engine compartment opening
18 Warm air opening
19 Adjusting element
19a First section
19b Second section
20 Dust pre-separator
21 Guide element
22 Handle
23 Cover element
24 Spark plug
25 Cooling rib
26 Guide slit
27 Carburettor chamber housing
28 Guide receptacle

The invention claimed is:

1. A motor-driven implement, comprising:
    an internal combustion engine having at least one cylinder and at least one carburettor, which is disposed in a carburettor chamber, which is separated by an intermediate wall from an engine compartment,
    wherein a fan wheel is further provided by which means non-heated or only slightly heated air from the engine compartment can be introduced through an engine compartment opening in the intermediate wall into the carburettor chamber,
    wherein in addition to the engine compartment opening, a warm air opening is provided in the intermediate wall, through which the air heated over the cylinder can be introduced into the carburettor chamber and wherein an adjusting element is provided which can be brought into a summer position in which the engine compartment opening is open and the warm air opening is closed and which can be brought into a winter position in which the engine compartment opening is closed and the warm air opening is open.

2. The motor-driven implement according to claim 1, wherein a dust pre-separator is provided and is connected at least to the engine compartment opening and wherein the engine compartment opening preferably penetrates through the intermediate wall in the lower area of the carburettor chamber and at the height of a crank case of the internal combustion engine opens into the lower area of the engine compartment facing away from the cylinder.

3. The motor-driven implement according to claim 2, wherein the dust pre-separator is connected to the warm air opening, wherein the cylinder is disposed in the air flow between the dust pre-separator and the warm air opening.

4. The motor-driven implement according to claim 1, wherein the adjusting element is configured as a sliding element that can be moved linearly to and fro between the summer position and the winter position.

5. The motor-driven implement according to claim 1, wherein the adjusting element is configured as a sheet metal component and comprises a first section which is configured to close the engine compartment opening and a second section which is configured to close the warm air opening.

6. The motor-driven implement according to claim 1, wherein the intermediate wall comprises a flat extension at least in sections, wherein the adjusting element is disposed plane-parallel and adjacent to the intermediate wall.

7. The motor-driven implement according to claim 1, wherein the engine compartment opening is disposed on a first side of the carburettor and the warm air opening is disposed on a second side of the carburettor opposite the first side.

8. The motor-driven implement according to claim 1, wherein the adjusting element has a U-shaped configuration wherein a first leg of the U shape forms the first section and a second leg of the U shape forms the second section and that the carburettor is arranged encased in the U shape.

9. The motor-driven implement according to claim 1, wherein guide elements are provided which are used for guidance of the linear movement of the adjusting element, wherein the guide elements are disposed in or on the intermediate wall.

10. The motor-driven implement according to claim 1, wherein a handle is provided on the adjusting element which is used for manual actuation of the adjusting element.

11. The motor-driven implement according to claim 1, wherein the carburettor chamber is formed at least partially by at least one cover element in such a manner that an air inflow into the carburettor chamber is limited to an air inflow through the engine compartment opening or through the warm air opening.

12. The motor-driven implement according to claim 1, wherein a spark plug is provided in the area of the upper part of the cylinder, wherein the warm air opening is disposed in the area of the spark plug, in the area 10 mm above the upper dead point of a piston guided in the cylinder and in the area of cooling ribs disposed on the upper side of the cylinder.

* * * * *